United States Patent Office 3,351,605
Patented Nov. 7, 1967

3,351,605
PHENOL-PARA-CUMYL-PHENOL RESIN
AND PRIMER THEREFROM
Patrick J. Harvey, Pearl River, N.Y., assignor to Allied
Chemical Corporation, New York, N.Y., a corporation
of New York
No Drawing. Filed Dec. 26, 1963, Ser. No. 333,668
18 Claims. (Cl. 260—33.4)

ABSTRACT OF THE DISCLOSURE

The present invention more specifically relates to novel phenol-para-alpha-cumylphenol-formaldehyde resin and coating compositions based thereon especially useful as primers for heavy duty enamel coatings such as coal tar enamels for water pipe, said resin comprising the reaction product of formaldehyde with a mixture of phenols comprising a monohydric mononuclear phenol and between about 5 to 18 mol percent para-alpha-cumylphenol, said resin prepared by reacting said phenols and formaldehyde in the presence of ammonia or a basic amine at a temperature between about 40° C. to 150° C. until the reaction product contains less than about 3% by weight free formaldehyde.

---

This invention relates to phenol-aldehyde reaction products and more specifically to new and improved resins produced by reaction of phenol and para-cumyl-phenol with formaldehyde. The invention also specifically relates to coatings produced from such resins and particularly coatings adapted to serve as primers for heavy duty enamels such as coal tar enamels.

Primers represent a well-known class of materials used as undercoatings for paints, enamels, etc. A particular field of interest where primers are of the utmost importance is underground piping such as in water works installations. In such applications the pipe which is usually made of steel is first coated with a primer which is allowed to dry. The dry primed surface is then coated with enamel which is conventionally a coal tar enamel applied at a high temperature between 400–500° F. In water works applications it is conventional to prime and subsequently enamel both the inside and outside of the pipe. This procedure alone creates severe temperature conditions which require a primer obviously meeting a number of rigid specifications. For example, primers which tend to be too thermosetting will tend to set up and lose their priming or bonding characteristics due to heat transfer through the pipe on application of the hot enamel on the opposite side. Conversely, primers which are excessively thermoplastic tend to flux even under the heat from sunlight as encountered during storage in the field. Primers suitable for water works and other installations also must not be subject to effect by temperature, water, moisture or other atmospheric conditions which may cause peeling or failure of either the exposed primer coating or the bond between the primer and later applied enamel coating.

The primers of long standing and satisfactory in many respects are those which are coal tar based. However, these primers have the one rather outstanding disadvantage of requiring long drying times before it is permissible to apply the enamel. This obviously cuts down on the efficiency of the primer-enamel and application and increases the cost of the piping installations. Considerable effort has been made to develop new primers which dry within a short time and which also meet the rigid specifications for water works installations. In this endeavor the art has had some success in providing a primer of shorter drying time than the coal tar based primers by utilizing certain materials based on chlorinated natural rubber. However, the chlorinated natural rubbers are relatively premium materials and lack heat resistance which of course is an important factor in a primer which may be subjected to high in-service temperature conditions. And still, other application and performance characteristics of the chlorinated rubber based primers have left considerable room for improvement.

The phenol-aldehyde condensation polymers are a well-known broad class of resinous materials. Such polymers are relatively inexpensive products which are adapted for a variety of uses depending largely on the particular reactants employed and their method of preparation. The phenolic resins have been used heretofore in make up of surface coatings such as varnishes and enamels. However, a phenolic resin suitable for use as a heavy duty primer for pipe in water works applications has not been heretofore provided. During my experimentation several phenol-aldehyde formulations were tried but were found to fail to meet the rigid specifications for such primer applications.

An object of the present invention is to provide a new and improved phenolic resin suitable as a surface coating. Another object of the invention is to provide a quick-drying primer generally suitable for heavy duty applications including underground water works installations.

A further object of the invention is to provide a new and improved quick-drying primer of low cost and superior properties and based on phenol-aldehyde reaction products.

Other objects and advantages will be evident from the following description of the invention.

In accordance with the present invention it has been found that phenol-aldehyde reaction product suitable for use in a heavy duty primer may be produced by heat reacting a mixture of phenols containing predominantly monohydric mononuclear phenol having the three reaction favorable positions unoccupied, preferably ordinary phenol, and a minor amount of para-α-cumylphenol together with formaldehyde or a formaldehyde yielding material in the molar proportion of about 1.0–1.5 mols of formaldehyde per mole of total phenol. The proportions of the mononuclear phenol and para-α-cumylphenol are such that the reaction mixture contains about 82 to 95 mol percent phenol and 5 to 18 mol percent para-α-cumylphenol. Reaction to form the resin is preferably carried out at temperatures between about 40–150° C., desirably under reflux at 60–100° C., and in the presence of a basic catalyst preferably selected from the group consisting of ammonia and the basic amines. The water insoluble resinous product is converted readily to a surface coating or primer by dissolving in a suitable high volatile solvent. The primer produced in accordance with the invention is a superior material of excellent overall properties including (1) exceptionally low drying time which reduces the time interval between application of primer and enamel; (2) very good high resistance when subjected to elevated temperature conditions; (3) both the primed and subsequently enameled surfaces exhibit lasting resistance to moisture and atmospheric conditions; (4) the primer has good peel resistance and passes the stringent "Initial Peel Test" of the American Water Works Association for heavy duty pipe primers; (5) the primer forms a bond of exceptional strength both with underlying metal and overcoated enamel and demonstrates excellent resistance to enamel deterioration when subjected to either high temperature conditions or immersion in water at elevated temperatures for extended time periods; and (6) the primer of the invention has excellent spreading characteristics enabling efficient and effective coating of metal surfaces with a minimum amount of the primer and at considerable saving in cost.

The quick-drying primer of the present invention is formed only if the para-α-cumylphenol represents a limited small proportion of the total mixture of phenols which are subjected to reaction with formaldehyde. The para-α-cumylphenol should not exceed more than 18 mol precent of the total amount of phenol employed as above such amount the reaction product is too thermoplastic to preform satisfactorily as a primer. On the other hand, at least about 5 mol percent of para-α-cumylphenol is required as lesser amounts result in a reaction product which is highly thermosetting and unsuitable for use as a primer. Particularly excellent results are obtained when the para-α-cumylphenol represents between about 7 to 13 mol percent of the total amount of phenol subjected to reaction.

The amount of formaldehyde reacted with the phenols to produce the primer of the invention is controlled within the range of about 1.0 to 1.5 mols per mol of total phenol. An amount of formaldehyde less than about 1.0 mol per mol of total phenol results in a resinous product which is undesirbly thermoplastic while greater than 1.5 mol per mol of total phenol produces a resin which is too thermoplastic to be used satisfactorily as a heavy duty primer. Best results are obtained when the amount of formaldehyde is between about 1.0 to 1.3 mols per mol of total phenol. Ordinary formaldehyde in the form of an aqueous solution containing, for example 50-60% formaldehyde, is preferably employed although other sources of this reactant such as paraformaldehyde may also be used.

The reaction to produce the phenol-para-cumylphenol product in accordance with the invention is carried out in the presence of a basic catalyst. The preferred basic catalyst giving particularly good results is ammonia which is desirably supplied in the form of an aqueous solution. Other basic catalysts which may be employed include the basic amines such as methyl amine, ethyl amine, ethylene diamine, triethylene tetramine, and hexamethylene tetramine. The amount of basic catalyst required is relatively small and usually between about 0.2 to 5.0% by weight of total phenols depending on the catalyst selected and conditions of the reaction. The amount of ammonia employed is preferably within the range of about 0.5 to 3.0% by weight of total phenol. Best results are obtained when ammonia is employed in an amount between about 0.75 to 1.5% by weight of total phenol.

Reaction temperatures employed in preparing the phenol-para-cumylphenol resin of the invention are generally within the range of about 40° C. to 150° C. A preferred method of preparation of the phenol-para-cumylphenol reaction product is carried out under reflux at a temperature preferably between about 60° C. to about 100° C. In the preferred method of preparation under reflux the phenol and para-cumylphenol are first agitated together for a short time at typically about 40-50° C. to allow the cumylphenol to dissolve in the phenol. The formaldehyde in the form of an aqueous solution containing, for example, 55% formaldehyde, is added to the phenol mixture and combined therewith under agitation while maintaining a temperature of about 40-50° C. The basic catalyst, preferably aqueous ammonia, is then added and the mixture of reactants prepared for reflux by placing under a slight vacuum which may typically range from about 2 to 12 inches of mercury, more usually between about 3 to 10 inches of mercury. The reaction mixture is then heated to preferably between about 60-100° C. and refluxed under vacuum until the free formaldehyde content of the reaction mixture is substantially reduced, generally to less than about 10% by weight of the reaction mixture, more usually to between 2-5%. Reaction time to reduce the free formaldehyde content to less than about 10% is about ½ to 4 hours, more usually about 1 to 3 hours. After reduction to less than about 10% free formaldehyde, desirably to less than 5%, the reaction mixture is dehydrated which is preferably accomplished by increasing the vacuum to about 15-28 inches of mercury. Dehydration is preferably carried out at a temperature between about 60-85° C. over the course of about 2 to 4 hours until the reaction mixture contains less than about 5% water. After dehydration the reaction may be continued to completion by further heating at a temperature preferably between about 60-110° C. and at about atmospheric pressure. Completion of the reaction to produce the resinous product of the invention may be determined in several ways. An accurate method of ascertaining of the reaction is by the well-known "stroke cure" method. The reaction product of the invention suitable for use as a primer will have a stroke curve value of less than about 60 seconds at a hot plate temperature of 150° C., preferably a stroke cure between about 15-50 seconds. If desired, a small amount of the volatile solvent to be employed in converting the reaction product into a primer may be added during the final reaction period to aid in processing. To produce a phenolic resin suitable as a coating it is desirable that the reaction be carried out such that the product has a final free formaldehyde content less than 3% by weight, desirably less than 2%, and a final free water content also less than 3% by weight, desirably less than 2% by weight. After completion the reaction product is cooled to approximately room temperature and converted to a quick-drying primer of excellent overall properties by addition of a suitable volatile solvent. Sufficient solvent is generally added to form a solution having a phenolic resin solids content between about 15 to 45% by weight, preferably a solution having a resin solids content between about 25 to 35% by weight. The preferred solvent employed in forming the primer of the invention is ethanol. Other suitable high volatile solvents which may be also employed include methanol, isopropanol and methylisobutylketone. The resinous product produced in accordance with the invention is of light color and suitable dyestuffs may be added as a visual aid in applying as a primer. About ½ to 5 parts of a black dyestuff per 100 parts of the resin in usually adequate.

The phenol-part-α-cumylphenol resin produced for use as primer by the invention may be also admixed with other additives as desired or required for the particular application. For example, the resin may be plasticized as often conventional with heavy duty pipe priming resins in order to assure flexibility of the primer film. Plasticizing materials which may be employed with the para-α-cumylphenol resin include polyvinylbutyral, epoxidized soya bean oil and the phthalic ester plasticizers such as dioctyl phthalate. The amount of plasticizer employed is usually between about 1 to 10 parts per 100 parts by weight of the phenolic resin, preferably between about 2 to 5 parts per 100 parts of the resin.

The monohydric mononuclear phenols suitable for use in the invention are those having the three reaction favorable positions unoccupied by any substituent for the nuclear hydrogen atom. The three reaction favorable positions in the aromatic phenol nucleus are well known to be the positions ortho and para with respect to the hydroxyl group. Hence the mononuclear phenols having the two ortho positions and the para position unoccupied are those which may be used in forming the phenol-para-α-cumylphenol product of the invention. In other terms, the only substituted mononuclear phenols which may be employed in the invention are those substituted only in the meta position with respect to the hydroxyl group. Ordinary phenol is the particularly preferred mononuclear phenol giving best results in practice of the invention. Other mononuclear phenols which satisfy the rule that the three reaction favorable positions be unoccupied include meta-cresol, meta-xylenol and meta-chlorocresol. When the substituent in the meta position is aliphatic the number of carbon atoms in such substituent should not exceed three. Preferably, the aliphatic substituents are limited to the alkyl groups having one or two carbon atoms.

The para-α-cumylphenol used in the present invention is also referred to properly as para-alpha, alpha-dimethylbenzyl phenol and is a known chemical compound of the structural formula.

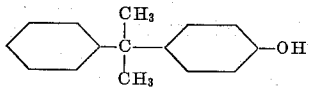

It may be prepared by condensation of cumyl chloride or bromide with ordinary phenol in the presence of a suitable catalyst such as aluminum chloride or bromide at temperatures up to about 40° C. The cumyl chloride or bromide may be prepared by esterification of dimethyl phenyl carbinol with hydrogen chloride or bromide. Para-α-cumylphenol may also be prepared by condensing alpha-methylstyrene with phenol in the presence of a catalyst such as aluminum chloride, ferric chloride or stannic chloride. Another satisfactory method of preparing para-α-cumylphenol is described in U.S.P. 2,769,844 of November 6, 1956 to G. G. Joris, by reaction of phenol or cumene oxidation products and dimethyl phenyl carbinol in controlled proportions in the presence of catalyst such as sulfuric acid.

The following example in which parts are by weight illustrates the practice and advantages of the present invention.

*Example 1*

About 1629 parts of phenol and 407 parts of para-α-cumylphenol were charged to a reaction kettle and agitated for about 30 minutes at 42° C. to allow the cumylphenol to dissolve in the phenol. To the phenol mixture there was then slowly added with constant stirring about 1186 parts of a 55% aqueous solution of formaldehyde. Addition of the formaldehyde was over a period of about 1 hour while maintaining temperature of the reactants at 42°C. The reaction kettle was then placed under a vacuum of about 22 inches of mercury and about 72 parts of a 28.2% aqueous solution of ammonia was added over the course of 15 minutes while maintaining the reactants at a temperature of about 46° C. The reaction mixture as originally constituted contained the phenol and para-α-cumylphenol in a mol ratio of about 9 to 1. The amount of formaldehyde charged was such that the mol ratio of total phenols to formaldehyde was about 1 to 1.13. The amount of ammonia initially charged was about 1.0% by weight of the total phenols in the reaction mixture. After addition of the ammonia catalyst the reaction mixture was heated to a reflux temperature of about 96° C. over the course of about 60 minutes while slowly reducing the vacuum to about 4 inches of mercury. The reaction mass was maintained under reflux at a temperature of 96° C. at a vacuum of 4 inches of mercury for about 45 minutes until the free formaldehyde content of the reaction mixture was about 3.1% as determined using the well-known hydroxylamine-hydrochloride method. Vacuum was then increased to about 20.5 inches of mercury over a period of about 50 minutes and the reaction mass dehydrated over the course of about 220 minutes. During dehydration the temperature of the reaction mass increased and was regulated below about 82° C. by increasing the vacuum up to 26 inches of mercury as required. After the dehydration step the vacuum was removed and about 329 parts of denatured ethanol was added to the reaction mass at a temperature of about 68° C. over a period of about 15 minutes to facilitate determination of the stroke cure value of the resinous product. The reaction mass after dehydration had an initial stroke cure value of 92 seconds at a hot plate temperature of 150° C. After addition of the ethanol the reaction mass was heated to about 92° C. over of about 30 minutes and maintained at such temperature for additional 70 minutes until the resinous product had a stroke cure value of 34 seconds indicating completion of the reaction. The resinous product was then slowly cooled for 190 minutes during which there was added about 2900 parts of denatured ethanol to adjust the solids content to about 36% by weight. There was then added about 1170 parts of a denatured ethanol solution containing 2% by weight of a black resinous dyestuff, supplied under the trademark "Nubian" by the National Aniline Division of the Allied Chemical Company. The dyestuff was added as a visual aid in application of the resin solution as a primer. About 6770 parts of resin solution having solids content of about 30.9% by weight was recovered from the reactor. The final free formaldehyde content of the resinous product was 0.6% by weight and the final free water content about 1.8%.

The solution of the resinous phenol-para-α-cumylphenol reaction product was evaluated as a primer by a series of tests conducted in accordance with the American Water Works Association (AWWA) procedures as outlined in the Association's "Standard Specifications for Coal Tar Protective Coatings for Steel Water Pipe." The tests and results are summarized in Table 1, below.

TABLE 1

| Test | Test Temp., Deg. F. | Phenolic Quick-Drying Primer | AWWA Specification |
| --- | --- | --- | --- |
| Initial Peel, In | 80<br>100<br>120<br>140<br>160 | No peel in all cases. | No Peel. |
| Aged Peel, In.—Peel Test After 3 days at 160° F. | 80<br>100<br>120<br>140<br>160 | No Peel in all cases. | No Peel. |
| Sag Test At 160° F. In | | 1/32 | Max. 2/32. |
| Enamel Cracking At Minus 20° F | | No Cracks | No Cracks. |
| Deflection Test:<br>  Initial Crack In<br>  Disbonded Area, Sq. In | | 1.5+<br>None | Min. 0.8.<br>Max. 3.0. |
| Deflection Test on Altered Enamel:<br>  Initial Crack, In<br>  Disbonded Area, Sq. In | | 1.5+<br>None | Min. 0.6.<br>Max. 5.0. |
| Impact Test at 77° F.: Disbonded Area, Sq. In | | 0.5 | Max. 10.0. |

In the above tests the phenolic resin primer of the invention was applied to freshly sand-blasted steel plates at a rate of about 500–700 sq. ft./gal. The application rate of 500–700 sq. ft./gal. was observed to form an effectively primed surface whereas only 300–500 sq. ft. could be covered per gallon when using a commercially available chlorinated rubber based primer. The primer was also found to become dry to the touch in as little as about 10 seconds after application. The surfaces coated with the primer of the invention were covered with a conventional coal tar enamel which was applied at a temperature of about 465° F. The rigid standards of the American Water Works Association for heavy duty pipe primer, as shown by Table 1 above, are clearly satisfied by the phenolic resin primer of the invention.

Although certain preferred embodiments of the invention have been disclosed for purpose of illustration, it will be evident that various changes and modifications may be made therein without departing from the scope and spirit of the invention.

I claim:

1. The process for producing a resinous product of outstanding chemical and physical properties especially adapted for primer coatings which comprises heating a mixture of phenols containing 82 to 95 mol percent monohydric mononuclear phenol having the three reaction favorable positions unoccupied and between about 5 to 18 mol percent para-α-cumylphenol together with formaldehyde in the molar proportion of about 1.0–1.5 mols of formaldehyde per mol of total phenol at a temperature between about 40° C. to 150° C. in the presence of a basic catalyst selected from the group consisting of ammonia and the basic amines to effect reaction of the phenols and formaldehyde and form a phenol-para-α-cumylphenol reaction product containing less than 3% by weight free formaldehyde.

2. The process of claim 1 in which the mixture of phenols contains between about 87 to 93 mol percent phenol and between about 7 to 13 mol percent para-α-cumylphenol.

3. The process of claim 1 in which the basic catalyst is ammonia in an amount between about 0.5 to 3.0% by weight of total phenol.

4. The process of claim 1 in which the reaction temperature is between about 60–100° C.

5. The process of claim 1 in which the molar proportion of formaldehyde to total phenol is between about 1.0:1.0 to 1.3:1.0.

6. The process for producing a resinous product of outstanding chemical and physical properties especially adapted for primer coatings which comprises heating a mixture of phenols containing 82 and 95 mol percent monohydric mononuclear phenol having the three reaction favorable positions unoccupied and between about 5 to 18 mol percent para-α-cumylphenol together with formaldehyde in the molar proportion of about 1.0–1.3 mols of formaldehyde per mol of total phenol at a temperature between about 60° C. to 100° C. in the presence of a basic catalyst selected from the group consisting of ammonia and the basic amines until the free formaldehyde content of the reaction mass is less than 10% by weight, dehydrating the reaction mass to less than 5% by weight water, and thereafter continuing the heating of the reaction mass at a temperature betwen about 60° C. to 110° C. to form a phenol-para-α-cumylphenol reaction product containing less than 3% by weight free formaldehyde and having a stroke cure value less than about 60 seconds.

7. The process of claim 6 in which the mixture of phenols contains between about 87 to 93 mol percent phenol and 7 to 13 mol percent para-α-cumylphenol and 7 to 13 mol percent para-α-cumylphenol.

8. The process of claim 6 in which the ammonia is present in an amount between about 0.5 to 3.0% by weight of total phenol.

9. The process of claim 6 in which the phenol-para-α-cumylphenol reaction product is dissolved in a high volatile solvent.

10. A phenol-para-α-cumylphenol resin especially suitable as a surface coating which is the reaction product produced in the presence of a basic catalyst selected from the group consisting of ammonia and the basic amines on heating a mixture of phenols containing 82 to 95 mol percent monohydric mononuclear phenol having the three reaction favorable positions unoccupied and between about 5 to 18 mol percent para-α-cumylphenol together with formaldehyde in the molar proportion of about 1.0–1.5 mols of formaldehyde per mol of total phenol, said reaction product having less than about 3% free formaldehyde and less than about 3% free water, and a stroke cure value of less than 60 seconds.

11. The resinous product of claim 10 in which the catalyst is ammonia in amount between about 0.5 to 3.0 percent by weight of total phenols.

12. The resinous product of claim 10 in which the mixture of phenols contains 87 to 93 mol percent phenol and 7 to 13 mol percent para-α-cumylphenol.

13. A phenol-para-α-cumylphenol resin especially suitable as a surface coating which is the reaction product produced in the presence of ammonia as catalyst on heating to a temperature between about 40° C. to 150° C. a mixture of phenols containing 82 to 95 mol percent phenol and between about 5 to 18 mol percent para-α-cumylphenol together with formaldehyde in the molar proportion of about 1.0–1.5 mols of formaldehyde per mol of total phenol, said reaction product having less than about 3% free formaldehyde and less than about 3% free water, and a stroke cure value of less than 60 seconds.

14. A phenol-para-α-cumylphenol resin respecially suitable as a surface coating which is the reaction product produced in the presence of ammonia as catalyst on heating to a temperature between 60° C. to 100° C. a mixture of phenols containing between about 87 to 93 mol percent phenol and between 7 to 13 mol percent para-α-cumylphenol together with formaldehyde in the molar proportion of about 1.0–1.3 mols of formaldehyde per mol of total phenol, said reaction product having less than about 2% free formaldehyde and less than about 2% free water, and a stroke cure value between about 15 to 50 seconds.

15. A surface coating composed of a solution of the phenol-para-α-cumylphenol resin of claim 10 in a volatile solvent.

16. A surface coating composed of a solution of phenol-para-α-cumylphenol resin of claim 13 in ethanol in an amount sufficient to form a 15–45% by weight solution of said resin in said ethanol.

17. A surface coating composed of a solution of phenol-para-α-cumylphenol resin of claim 14 in ethanol in amount sufficient to form a 25–35% by weight solution of said resin in said ethanol.

18. Metal primed with the phenol-para-α-cumylphenol resin of claim 10.

References Cited
UNITED STATES PATENTS

| | | | |
|---|---|---|---|
| 2,079,210 | 5/1937 | Honel | 260—4 |
| 2,926,149 | 2/1960 | Backer | 260—19 |
| 3,058,954 | 10/1962 | Brown et al. | 260—51 |

MORRIS LIEBMAN, *Primary Examiner.*

R. BARON, *Assistant Examiner.*